United States Patent
Ngo et al.

(10) Patent No.: US 7,439,695 B2
(45) Date of Patent: Oct. 21, 2008

(54) MECHANICAL BRAKING SYSTEM FOR USE ON A VEHICLE HAVING AN ELECTRIC PROPULSION SYSTEM AND AUTOMATIC RETARD SPEED REGULATION

(75) Inventors: Khanh Tu Ngo, Peoria, IL (US); Nobuki Hasegawa, Tokyo (JP); Gerald Horst, Edelstein, IL (US)

(73) Assignee: Komatsu America Corp., Peoria, IL (US)

( * ) Notice: Subject to any disclaimer, the term of this patent is extended or adjusted under 35 U.S.C. 154(b) by 463 days.

(21) Appl. No.: 11/206,791

(22) Filed: Aug. 19, 2005

(65) Prior Publication Data

US 2007/0040522 A1    Feb. 22, 2007

(51) Int. Cl.
*H02P 3/00* (2006.01)
(52) U.S. Cl. .................... 318/362; 318/86; 318/34
(58) Field of Classification Search ............... 318/364, 318/370, 375
See application file for complete search history.

(56) References Cited

U.S. PATENT DOCUMENTS

| | | | |
|---|---|---|---|
| 4,495,449 A | | 1/1985 | Black et al. |
| 5,496,096 A | * | 3/1996 | Petersen et al. ............ 303/3 |
| 5,511,859 A | * | 4/1996 | Kade et al. ............ 303/3 |
| 5,572,187 A | * | 11/1996 | Williford ............ 340/454 |
| 5,573,312 A | | 11/1996 | Müller et al. |
| 5,839,800 A | * | 11/1998 | Koga et al. ............ 303/152 |
| 5,973,463 A | * | 10/1999 | Okuda et al. ............ 318/430 |
| 6,441,573 B1 | * | 8/2002 | Zuber et al. ............ 318/375 |
| 6,459,980 B1 | * | 10/2002 | Tabata et al. ............ 701/70 |
| 6,571,163 B1 | * | 5/2003 | Heckmann et al. ........ 701/70 |
| 6,719,076 B1 | * | 4/2004 | Tabata et al. ............ 180/65.7 |
| 6,731,084 B2 | | 5/2004 | Gagnon et al. |
| 7,024,290 B2 | | 4/2006 | Zhao et al. |
| 2002/0088653 A1 | * | 7/2002 | Takamoto et al. ......... 180/65.1 |

OTHER PUBLICATIONS

International Search Report issued Oct. 4, 2007 in International (PCT) Application No. PCT/US07/00228.
Written Opinion of the International Searching Authority issued Aug. 10, 2007 in International (PCT) Application No. PCT/US07/00228.

* cited by examiner

*Primary Examiner*—Lincoln Donovan
*Assistant Examiner*—David S Luo
(74) *Attorney, Agent, or Firm*—Wenderoth, Lind & Ponack, L.L.P.

(57) ABSTRACT

A mechanical braking system is provided for a vehicle having an electric propulsion system which is utilized for retard speed regulation. While the retard speed regulation is normally performed via electric braking, in some conditions the electric braking is not able to maintain a desired speed for the vehicle. In this condition, upon receipt of a signal from the electric propulsion system, the mechanical braking system is automatically activated so as to maintain the vehicle at the desired speed.

12 Claims, 3 Drawing Sheets

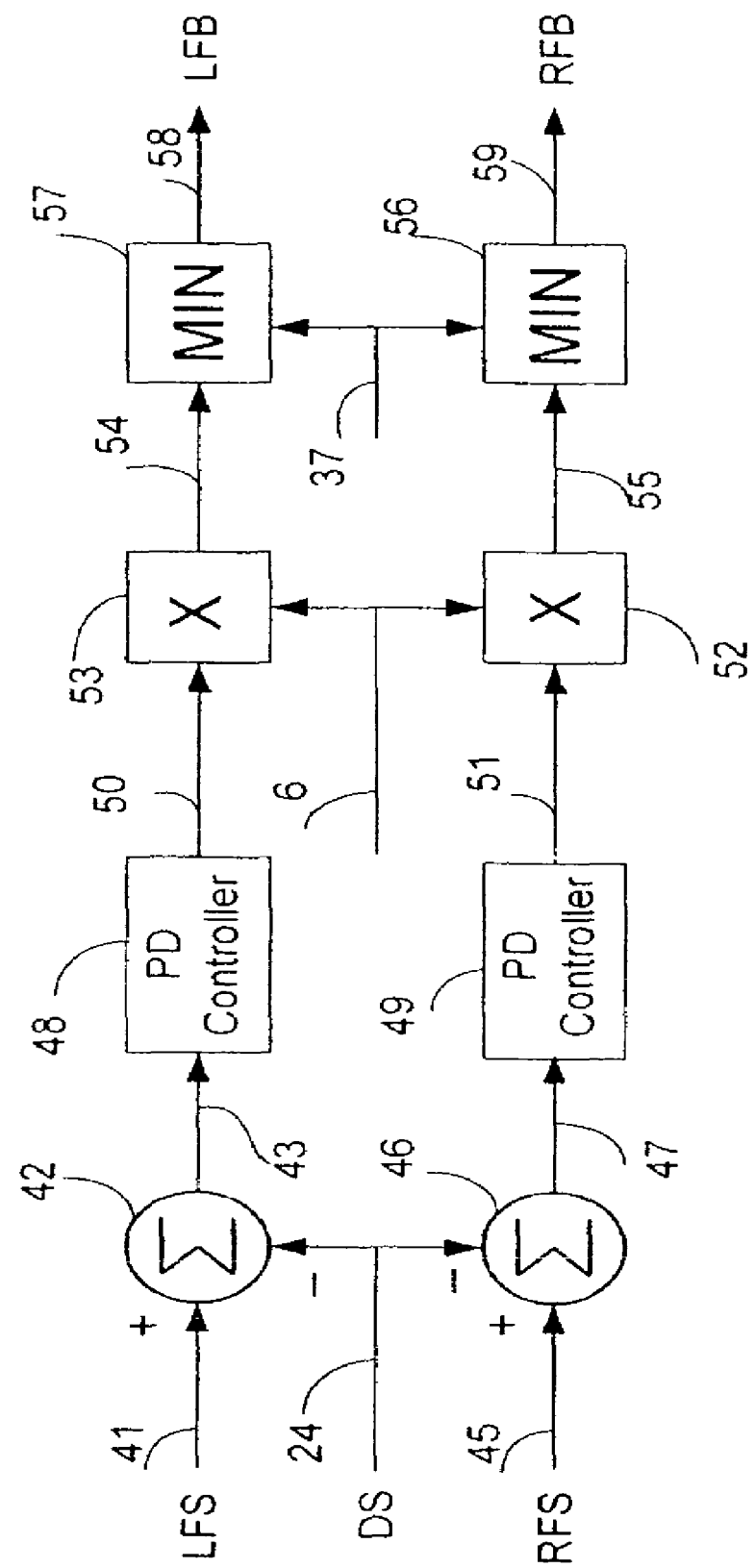

MECHANICAL BRAKING SYSTEM FOR USE ON A VEHICLE HAVING AN ELECTRIC PROPULSION SYSTEM AND AUTOMATIC RETARD SPEED REGULATION

BACKGROUND OF THE INVENTION

1. Field of the Invention

The present invention relates to a mechanical braking system for use on a vehicle. More particularly, the present invention relates to a mechanical braking system for use on a vehicle having an electric propulsion system and automatic retard speed regulation.

2. Related Art

An electric propulsion system for a vehicle, such as a traction vehicle, includes two electric traction motors coupled to a pair of rear wheels on opposite sides of the vehicle. The two electric motors are generally adjustable speed, reversible direct current (dc) motors and can operate so as to either propel or dynamically retard the traction vehicle.

In the propel mode, the two motors operate so as to adjust the speed of the vehicle. In the retard mode, or electric braking mode, the two motors behave as generators. Dynamic braking resistor grids are connected across the armatures of the respective motors in order to dissipate the electric power output of the motors during electric braking.

While in the retard mode, the goal of the two motors is to maintain a reference desired speed of the vehicle. For example, when the vehicle goes downhill, gravity will tend to accelerate the vehicle. In such a condition, the two motors will enter the electric braking mode to slow down the vehicle. Depending on the grade of road, however, it is possible that the electric motors will not be able to maintain the desired speed of vehicle. In addition, when the road condition is icy or wet, traction effort is reduced, and if one or both of the rear wheels becomes locked, the vehicle may enter a sliding mode. In this case, retard effort is reduced in order to avoid the sliding condition. Consequently, in some particular conditions of the road, the vehicle speed may increase, and the electric propulsion system cannot maintain the desired speed.

Under any such condition in which the electric propulsion system alone is not able to maintain the desired speed, an alarm signal may be output which alerts the driver of the vehicle that mechanical braking must be performed in order to maintain the desired speed of the vehicle. An example of an electric propulsion system for a traction vehicle which outputs such an alarm signal is disclosed in U.S. Pat. No. 4,495,449, the disclosure of which is incorporated herein by reference in its entirety.

Manually applying a mechanical braking system after such an alarm is received, however, requires that the driver of the vehicle be aware of the desired vehicle speed, and that the driver be able to apply the braking in an appropriate manner. Therefore, what is needed is a mechanical braking system that can be automatically applied so as to maintain a desired speed of a vehicle when the electric propulsion system of the vehicle is not able to maintain the desired speed by itself.

SUMMARY OF THE INVENTION

Accordingly, it is a general objective of the present invention to provide a mechanical braking system that is automatically applied to help maintain the desired speed of a vehicle when the electric propulsion system fails to achieve the goal of maintaining the desired speed. The electric propulsion system operates by outputting an alarm signal, which, when active, indicates that mechanical braking must be used to maintain the desired speed.

In accordance with one aspect of the present invention, the alarm signal output by the electric propulsion system is used to automatically active the mechanical braking system, the mechanical braking system including four brake controllers, two for two front wheels of the vehicle, and two for two rear wheels of the vehicle. The mechanical braking system according to the present invention may be, for example, a hydraulic braking system.

In accordance with another aspect of the present invention, a gain control circuit is provided which is responsible for outputting a gain signal to each of the four brake controllers, whereby the brake signals generated by the brake controllers for the front wheels are controlled so as to always be equal to or less than the brake signals generated by the brake controllers for the rear wheels of the vehicle.

The above and other features of the invention including various and novel details of construction and combination of parts will now be more fully described with reference to the accompanying drawings and pointed out in the claims. It will be understood that the particular features embodying the invention are shown by way of illustration only and not as a limitation of the invention. The principles and features of this invention may be employed in varied and numerous embodiments without departing from the scope of the invention.

BRIEF DESCRIPTION OF THE DRAWINGS

Aspects of illustrative, non-limiting embodiments of the present invention will become more apparent by describing in detail embodiments thereof with reference to the attached drawings in which:

FIG. 3 is the block diagram of the two brake controllers for the two front wheels of the vehicle according to the present invention.

DETAILED DESCRIPTION OF THE INVENTION

The following description of the invention discloses specific configurations, features, and operations. However, the description is merely of an example of the present invention, and thus, the specific features described below are merely used to more easily describe the invention and to provide an overall understanding of the present invention.

Accordingly, one skilled in the art will readily recognize that the present invention is not limited to the specific embodiments described below. Furthermore, the description of various configurations, features, and operations of the present invention that are known to one skilled in the art are omitted for the sake of clarity and brevity. Also, it is to be understood that the phraseology and terminology employed herein is for the purpose of description and should not be regarded as limiting.

Figure 1:
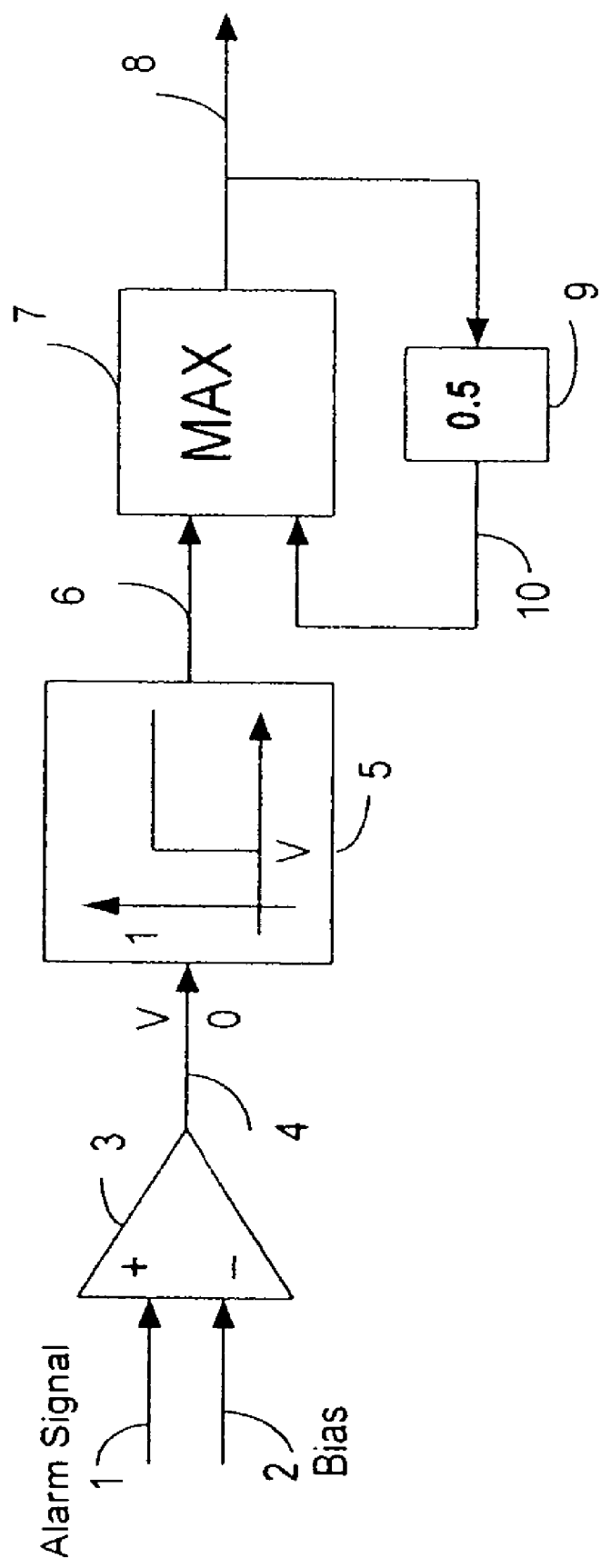
FIG. 1 is a block diagram of a gain control circuit for the brake controllers according to the present invention.

FIG. 1 is a block diagram of a gain control circuit according to the present invention, in which it is shown how the alarm signal output by the electric propulsion system is used to obtain the gain for each of the brake controllers used in the mechanical braking system. In particular, as shown in FIG. 1, the alarm signal 1 enters the plus (+) input of a comparator 3, and a bias signal 2 enters the minus (−) input of the comparator 3. The bias value to be used is, for example, half of the voltage value of the alarm signal 1.

Therefore, an output signal 4 of the comparator is either equal to V, the supply voltage of the comparator if the alarm signal is non-zero (e.g., logical 1), or equal to zero if the alarm signal 1 is zero (e.g., logical 0). The output signal 4 enters a functional block 5, which produces an output signal 6 as a constant scalar either equal to "1" if the voltage level of the input signal 4 is equal to V, or equal to "0" if the voltage level of the input 4 is equal to zero.

The output signal 6 will be used as the gain for two front brake controllers as described below with reference to FIG. 3. As shown in FIG. 1, the output signal 6 of the functional block 5 is also input to a Maximum block 7. Accordingly, due to the configuration of the gain control circuit, an output signal 8 of the Maximum block 7 is the greater of the two input signals 6 and 10.

As shown in FIG. 1, the input signal 10 is the feedback from the output 8 via a gain block 9 of gain equal to 0.5. Accordingly, if the input signal 6 is one, the output signal 8 will also be one. However, if the input signal 6 changes from one to zero, then the input signal 10 of 0.5 will be the greater of the two inputs to the Maximum block 7, and therefore, the output signal 8 becomes 0.5.

At the next sampling, if the output signal 6 is still zero, the input signal 10 will reduce to 0.25, and therefore, the output signal 8 will be 0.25. During the next samplings, if the output signal 6 maintains to be zero, the output signal will be gradually reduced to zero. Therefore, the purpose of the functional block 7 is to reduce the output 8 gradually to zero if the input 6 is changed from one to zero.

In summary, the block diagram in FIG. 1 shows how the gain to the two front brake controllers and the gain to the two rear brake controllers is calculated. In short, the gain to the two front brake controllers will be one or zero depending on whether the alarm signal is at logical 1 or logical 0, respectively. Similarly, the gain to the two rear brake controllers will be 1 if the alarm signal is at logical 1, and will reduce gradually to zero if the alarm signal changes from logical 1 to logical 0.

According to an illustrative embodiment of the present invention, the mechanical braking system includes two brake controllers for the rear wheels of the vehicle and two brake controllers for the front wheels of the vehicle. The four brake controllers may each be embodied as a separate unit, or alternatively, two or more of the brake controllers may be integrated in a single unit.

Figure 2:
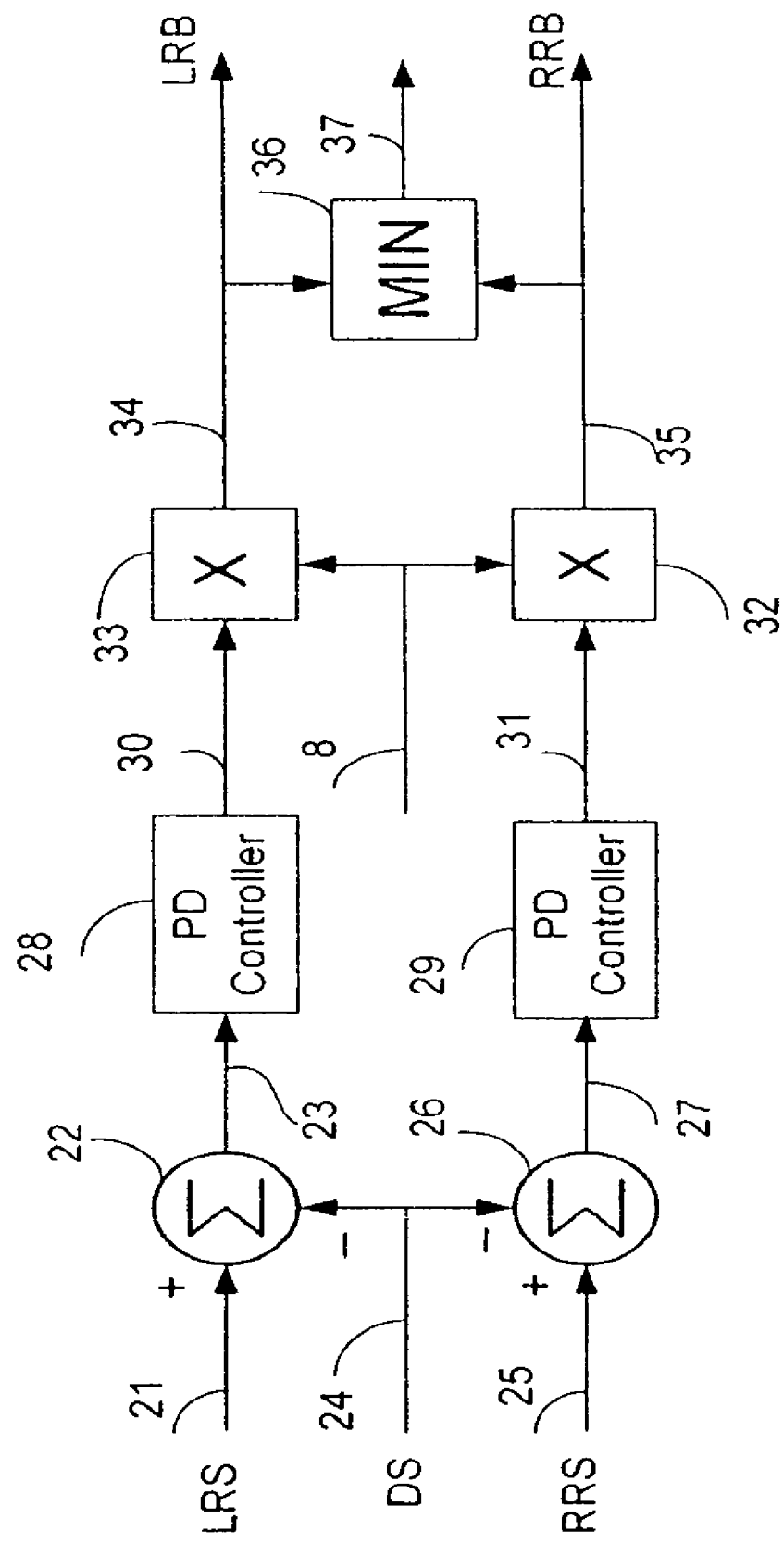
FIG. 2 is a block diagram of the two brake controllers for the two rear wheels of a vehicle according to the present invention.

As shown in FIG. 2, for the left rear wheel of the vehicle, a summer 22 takes the difference between a Left Rear Speed (LRS) signal 21 and a Desired Speed (DS) signal 24. The LRS signal 21 can be generated by a conventional speed sensor, and the DS signal 24 can be manually set by an individual. The summer 21 outputs the difference between these two signals as output signal 23 to a Proportional-Derivative (PD) controller 28.

Similarly, for the right rear wheel of the vehicle, a summer 26 takes the difference between a Right Rear Speed (RRS) signal 25, which can be generated by a conventional speed sensor, and the Desired Speed signal 24. The summer 26 outputs the difference between these two signals as output signal 27 to a Proportional-Derivative (PD) controller 29.

As shown in FIG. 2, an output signal 30 of the PD controller 28 enters a multiplier 33 along with the gain signal 8 from the gain control circuit as shown in FIG. 1. The output 34 of the multiplier 33, which is the product of the output signal 30 of the PD controller 28 and the gain signal 8, is the value of a Left Rear Brake (LRB) signal 34.

Similarly, an output signal 31 of the PD controller 29 enters a multiplier 32 along with the gain signal 8 from the gain control circuit as shown in FIG. 1. The output 35 of the multiplier 32, which is the product of the output signal 31 of the PD controller 29 and the gain signal 8, is the value of the Right Rear Brake (RRB) signal 35.

As shown in FIG. 2, the output signal 34 (i.e., the LRB signal) and the output signal 35 (i.e., the RRB signal) are also input to a Minimum block 36 which outputs the lesser value of the LRB signal 34 and the RRB signal 35 as output signal 37. As will be described below with reference to FIG. 3, the output signal 37 is used to control the two front brake signals.

As shown in FIG. 3, for the left front wheel, a summer 42 takes the difference between a Left Front Speed (LFS) signal 41, which can be generated by a conventional speed sensor, and the Desired Speed (DS) signal 24. The summer 42 outputs the difference between these two signals as output signal 43 to a Proportional-Derivative (PD) controller 48.

Similarly, for the right front wheel, a summer 46 takes the difference between a Right Front Speed (RFS) signal 45, which can be generated by a conventional speed sensor, and the Desired Speed (DS) signal 24. The summer 46 outputs the difference between these two signals as output signal 47 to a Proportional-Derivative (PD) controller 49.

As shown in FIG. 3, an output signal 50 of the PD controller 48 enters a multiplier 53 along with the gain signal 6 from the gain control circuit as shown in FIG. 1. The output 54 of the multiplier 53, which is the product of the output signal 50 of the PD controller 48 and the gain signal 6, enters the Minimum block 57. In addition, as shown in FIG. 3, the output 37 of the Minimum block 36 (see FIG. 2) also enters the Minimum block 57. Thus, in the Minimum block 57, the lesser of output signal 54 of the multiplier 53 and the output signal 37 of the Minimum block 36 is output as Left Front Brake (LFB) signal 58.

Similarly, the output signal 51 of the PD controller 49 enters a multiplier 52 along with the gain signal 6 from the gain control circuit as shown in FIG. 1. The output 55 of the multiplier 52, which is the product of the output signal 51 of the PD controller 49 and the gain signal 6, enters the Minimum block 56. In addition, as shown in FIG. 3, the output 37 of the Minimum block 36 (see FIG. 2) also enters the Minimum block 56. Thus, in the Minimum block 56, the lesser of output signal 55 of the multiplier 52 and the output signal 37 of the Minimum block 36 is output as Right Front Brake (RFB) signal 59.

Thus, as is evident from the above description, and as shown in FIGS. 2 and 3, while the brake signals at the front wheels (i.e., LFB and RFB) are calculated in a similar manner as the brake signals for the two rear wheels (i.e., LRB and RRB), the brake signals at the front wheels will always be less than or equal to the brake signals at the rear wheels. By generating the brake signals in this manner, the mechanical braking system according to the present invention will provide a smooth braking operation while maintaining the desired speed of the vehicle.

The previous description is provided to enable a person skilled in the art to make and use the present invention. Moreover, various modifications to the illustrative embodiments above will be readily apparent to those skilled in the art, and the generic principles and specific examples defined herein may be applied to other embodiments without the use of inventive faculty. Therefore, the present invention is not intended to be limited to the embodiments described herein but is to be accorded the widest scope as defined by the limitations of the claims and equivalents.

What is claimed is:

1. A braking system for use on a vehicle having an electric propulsion system, the electric propulsion system being operable to generate an alarm signal if the electric propulsion system is not able to control the vehicle at a desired speed, said braking system comprising:
   a first braking circuit operable to control an amount of braking that is to be applied to a first rear wheel of the vehicle by generating a first braking signal;
   a second braking circuit operable to control an amount of braking that is to be applied to a second rear wheel of the vehicle by generating a second braking signal;
   a third braking circuit operable to control an amount of braking that is to be applied to a first front wheel of the vehicle by generating a third braking signal; and
   a fourth braking circuit operable to control an amount of braking that is to be applied to a second front wheel of the vehicle by generating a fourth braking signal;
   wherein a value of the first braking signal for the first rear wheel, a value of the second braking signal for the second rear wheel, a value of the third braking signal for the first front wheel, and a value of the fourth braking signal for the second front wheel are automatically controlled based on the alarm signal output by the electric propulsion system,
   wherein the third braking signal generated by said third braking circuit and the fourth braking signal generated by said fourth braking circuit are controlled so as to always be smaller than or equal to the first braking signal generated by said first braking circuit and the second braking signal generated by said second braking circuit.

2. The braking system according to claim 1,
   wherein said first braking circuit has input thereto a signal indicating a speed of the first rear wheel of the vehicle and a signal indicating a desired reference speed;
   wherein said second braking circuit has input thereto a signal indicating a speed of the second rear wheel of the vehicle and the signal indicating the desired reference speed;
   wherein said third braking circuit has input thereto a signal indicating a speed of the first front wheel of the vehicle and the signal indicating the desired reference speed; and
   wherein said fourth braking circuit has input thereto a signal indicating a speed of the second front wheel of the vehicle and the signal indicating the desired reference speed.

3. The braking system according to claim 2,
   wherein said first braking circuit includes a first summing circuit operable to output a first signal indicating a difference between the desired reference speed and the speed of the first rear wheel of the vehicle, and a first controller operable to receive the first signal output by said first summing circuit;
   wherein said second braking circuit includes a second summing circuit operable to output a second signal indicating a difference between the desired reference speed and the speed of the second rear wheel of the vehicle, and a second controller operable to receive the second signal output by said first summing circuit;
   wherein said third braking circuit includes a third summing circuit operable to output a third signal indicating a difference between the desired reference speed and the speed of the first front wheel of the vehicle, and a third controller operable to receive the third signal output by said third summing circuit; and
   wherein said fourth braking circuit includes a fourth summing circuit operable to output a fourth signal indicating a difference between the desired reference speed and the speed of the second front wheel of the vehicle, and a fourth controller operable to receive the first signal output by said fourth summing circuit.

4. The braking system according to claim 3, wherein each of said first controller, said second controller, said third controller, and said fourth controller are chosen from the group consisting of a proportional controller, a proportional-derivative-integral controller, a proportional-derivative-integral with anti-windup controller, a linear quadratic Gaussian controller, a linear quadratic Gaussian with loop transfer recovery controller, a H∞ controller, and a H∞ controller with μ-synthesis.

5. The braking system according to claim 3, further comprising:
   a gain control circuit operable to receive the alarm signal generated by the electric propulsion system,
   wherein said gain control circuit is operable to generate signals to be output to said first braking circuit, said second braking circuit, said third braking circuit, and said fourth braking circuit.

6. The braking system according to claim 5,
   wherein said first braking circuit includes a first multiplier that receives an output of said first controller and a first output of said gain circuit, and outputs a product of the signal output by said first controller and the first output of said gain control circuit;
   wherein said second braking circuit includes a second multiplier that receives an output of said second controller and the first output of said gain circuit, and outputs a product of the signal output by said second controller and the first output of said gain control circuit;
   wherein said third braking circuit includes a third multiplier that receives an output of said third controller and a second output of said gain circuit, and outputs a product of the signal output by said third controller and the second output of said gain control circuit;
   wherein said fourth braking circuit includes a fourth multiplier that receives an output of said fourth controller and the second output of said gain circuit, and outputs a product of the signal output by said fourth controller and the second output of said gain control circuit.

7. A braking system for use on a vehicle having an electric propulsion system, the electric propulsion system being operable to generate an alarm signal if the electric propulsion system is not able to control the vehicle at a desired speed, said braking system comprising:
   a first braking circuit operable to control an amount of braking that is to be applied to a first rear wheel of the vehicle by generating a first braking signal;
   a second braking circuit operable to control an amount of braking that is to be applied to a second rear wheel of the vehicle by generating a second braking signal;
   a third braking circuit operable to control an amount of braking that is to be applied to a first front wheel of the vehicle by generatin2 a third braking signal; and
   a fourth braking circuit operable to control an amount of braking that is to be applied to a second front wheel of the vehicle by generating a fourth braking signal;
   wherein a value of the first braking signal for the first rear wheel, a value of the second braking signal for the second rear wheel, a value of the third braking signal for the first front wheel, and a value of the fourth braking signal for the second front wheel are automatically controlled based on the alarm signal output by the electric propulsion system;

wherein said first braking circuit has input thereto a signal indicating a speed of the first rear wheel of the vehicle and a signal indicating a desired reference speed;

wherein said second braking circuit has input thereto a signal indicating a speed of the second rear wheel of the vehicle and the signal indicating the desired reference speed;

wherein said third braking circuit has input thereto a signal indicating a speed of the first front wheel of the vehicle and the signal indicating the desired reference speed; and wherein said fourth braking circuit has input thereto a signal indicating a speed of the second front wheel of the vehicle and the signal indicating the desired reference speed;

wherein said first braking circuit includes a first summing circuit operable to output a first signal indicating a difference between the desired reference speed and the speed of the first rear wheel of the vehicle, and a first controller operable to receive the first signal output by said first summing circuit;

wherein said second braking circuit includes a second summing circuit operable to output a second signal indicating a difference between the desired reference speed and the speed of the second rear wheel of the vehicle, and a second controller operable to receive the second signal output by said first summing circuit;

wherein said third braking circuit includes a third summing circuit operable to output a third signal indicating a difference between the desired reference speed and the speed of the first front wheel of the vehicle, and a third controller operable to receive the third signal output by said third summing circuit;

wherein said fourth braking circuit includes a fourth summing circuit operable to output a fourth signal indicating a difference between the desired reference speed and the speed of the second front wheel of the vehicle, and a fourth controller operable to receive the first signal output by said fourth summing circuit;

wherein said braking system further comprises a gain control circuit operable to receive the alarm signal generated by the electric propulsion system;

wherein said gain control circuit is operable to generate signals to be output to said first braking circuit, said second braking circuit, said third braking circuit, and said fourth braking circuit;

wherein said first braking circuit includes a first multiplier that receives an output of said first controller and a first output of said gain circuit, and outputs a product of the signal output by said first controller and the first output of said gain control circuit;

wherein said second braking circuit includes a second multiplier that receives an output of said second controller and the first output of said gain circuit, and outputs a product of the signal output by said second controller and the first output of said gain control circuit;

wherein said third braking circuit includes a third multiplier that receives an output of said third controller and a second output of said gain circuit, and outputs a product of the signal output by said third controller and the second output of said gain control circuit;

wherein said fourth braking circuit includes a fourth multiplier that receives an output of said fourth controller and the second output of said gain circuit, and outputs a product of the signal output by said fourth controller and the second output of said gain control circuit;

wherein the output of said first multiplier and the output of said second multiplier are input to a first minimum circuit;

wherein said first minimum circuit outputs a smaller value of the output of said first multiplier and the output of said second multiplier;

wherein the output of said third multiplier is input to a second minimum circuit;

wherein the output of said fourth multiplier is input to a third minimum circuit;

wherein the output of said first minimum circuit is input to said second minimum circuit and said third minimum circuit;

wherein said second minimum circuit outputs a smaller value of the output of said third multiplier and the output of said first minimum circuit; and wherein said third minimum circuit outputs a smaller value of the output of said fourth multiplier and the output of said first minimum circuit.

8. The braking system according to claim 1, further comprising:
a gain control circuit operable to receive the alarm signal generated by the electric propulsion system,
wherein said gain control circuit is operable to generate signals to be output to said first braking circuit, said second braking circuit, said third braking circuit, and said fourth braking circuit.

9. The braking system according to claim 1,
wherein a gain of said first braking circuit, a gain of said second braking circuit, a gain of said third braking circuit, and a gain of said fourth braking circuit are based on the alarm signal generated by the electric propulsion system.

10. The braking system according to claim 9,
wherein the gain of said first braking circuit and the gain of said second braking circuit are controlled so as to be either one or gradually reduced to zero depending on a value of the alarm signal; and
wherein the gain of said third braking circuit and the gain of said fourth braking circuit are controlled so as to be either one or zero depending on the value of the alarm signal.

11. The braking system according to claim 2, wherein the desired reference speed is obtained from the electric propulsion system.

12. The braking system according to claim 1, wherein said braking system is a hydraulic braking system.

* * * * *